United States Patent
Smith (10) Patent No.: US 6,595,547 B2
(45) Date of Patent: Jul. 22, 2003

(54) AIRBAG INFLATOR DIFFUSION SYSTEM AND METHOD OF MANUFACTURE

(75) Inventor: Bradley W. Smith, Ogden, UT (US)

(73) Assignee: Autoliv ASP, Inc., Ogden, UT (US)

( * ) Notice: Subject to any disclaimer, the term of this patent is extended or adjusted under 35 U.S.C. 154(b) by 0 days.

(21) Appl. No.: 09/872,124

(22) Filed: Jun. 1, 2001

(65) Prior Publication Data

US 2002/0180194 A1 Dec. 5, 2002

(51) Int. Cl.[7] .......................... B60R 21/28; B60R 21/26
(52) U.S. Cl. ..................... 280/736; 280/740; 280/742
(58) Field of Search ...................... 280/730.2, 736, 280/740, 742; 72/370.22, 370.23, 370.26

(56) References Cited

U.S. PATENT DOCUMENTS

| | | | | |
|---|---|---|---|---|
| 3,414,292 A | * | 12/1968 | Oldberg et al. | 280/740 |
| 3,476,403 A | * | 11/1969 | Richardson | 280/740 |
| 3,527,472 A | * | 9/1970 | Chute et al. | 280/740 |
| 3,602,526 A | * | 8/1971 | Brawn | 280/740 |
| 3,784,223 A | * | 1/1974 | Hass et al. | 280/740 |
| 4,930,331 A | * | 6/1990 | Manning | 72/370.23 |
| 5,666,848 A | * | 9/1997 | Burns | 72/370.23 |
| 5,924,727 A | * | 7/1999 | Honda et al. | 280/736 |
| 6,103,984 A | | 8/2000 | Bowers | |
| 6,244,619 B1 | | 6/2001 | Satzger | |

* cited by examiner

Primary Examiner—Lesley D. Morris
Assistant Examiner—Matthew Luby
(74) Attorney, Agent, or Firm—Sally J. Brown; James D. Erickson (57) ABSTRACT

An airbag inflator diffusion system is disclosed which is simple to fabricate, directs exhaust gas from a standardized inflator, sufficiently cools the exhaust gas, catches hot gas generant residue pieces, and sufficiently diffuses the exhaust gas. The system includes an airbag inflator, and a sleeve. The inflator has simple exit ports which are positioned along the length of the inflator. The sleeve is sized to receive the inflator. The sleeve includes lobes which project from its length. The lobes are positioned such that exhaust gas leaving an exit port is diverted by the lobe in at least two directions. The diverted exhaust gas is thereby cooled and allowed to disperse within the textile airbag. The system also includes a catch which may be a wire mesh. The catch further cools and causes the exhaust gas to disperse. In this way, a simple, effective diffuser for a curtain airbag inflator is provided.

28 Claims, 8 Drawing Sheets

AIRBAG INFLATOR DIFFUSION SYSTEM AND METHOD OF MANUFACTURE

BACKGROUND OF THE INVENTION

1. The Field of the Invention

The present invention relates to airbag inflation systems in motor vehicles. More specifically, the invention relates to an airbag diffusion system for diffusing inflation gases exiting a curtain airbag inflator.

2. Technical Background

Inflatable airbags are well accepted for use in motor vehicles and have been credited with preventing numerous deaths and injuries. Some statistics estimate that frontal airbags reduce the fatalities in head-on collisions by 25% among drivers using seat belts and by more than 30% among unbelted drivers. Statistics further suggest that with a combination of seat belt and airbag, serious chest injuries in frontal collisions can be reduced by 65% and serious head injuries by up to 75%. Airbag use presents clear benefits and vehicle owners are frequently willing to pay the added expense for airbags.

A modem airbag apparatus may include an electronic control unit (ECU) and one or more airbag modules. The ECU is usually installed in the middle of an automobile, between the passenger and engine compartments. If the vehicle has a driver airbag only, the ECU may be mounted in the steering wheel. The ECU includes a sensor which continuously monitors the acceleration and deceleration of the vehicle and sends this information to a processor which processes an algorithm to determine if the vehicle is in an accident situation.

When the processor determines that there is an accident situation, the ECU transmits an electrical current to an initiator in the airbag module. The initiator triggers operation of the inflator or gas generator which, in some embodiments, uses a combination of compressed gas and solid fuel. The inflator inflates a textile airbag to impact a passenger and prevent injury to the passenger. In some airbag apparatuses, the airbag may be fully inflated within 50 thousandths of a second and deflated within two tenths of a second.

An airbag cover, also called a trim cover panel, covers a compartment containing the airbag module and may reside on a steering wheel, dashboard, vehicle door, along a vehicle roof rail, vehicle wall, or beneath the dash board. The airbag cover is typically made of a rigid plastic and may be forced open by the pressure from the deploying airbag. In deploying the airbag, it is preferable to retain the airbag cover to prevent the airbag cover from flying loose in the passenger compartment. If the airbag cover freely moves into the passenger compartment, it may injure a passenger.

Airbag apparatuses have been primarily designed for deployment in front of the torso of an occupant between the upper torso of an occupant and the windshield or instrument panel. Conventional airbags, such as driver's or passenger airbags (hereinafter referenced as the "primary airbag"), protect the occupant's upper torso and head from colliding with a windshield or instrument panel.

Airbag technology has advanced to include airbag apparatuses which protect occupants during a side impact, or roll-over accident. In these accidents the occupant may be thrown against the windows, doors and side-walls of the vehicle. These airbag apparatuses are known as curtain airbags. Generally, the curtain airbag is attached to a thin long frame member which runs along a side of the roof of the vehicle. Often due to window size and visibility requirements, the curtain airbag apparatus has a long thin shape.

The airbag of a curtain airbag apparatus inflates and descends from the frame member to cover a majority of the area between the occupant and the side of the vehicle interior. The inflated airbag appears much like a curtain covering the vehicle window. The curtain airbag may protect the occupant from impact with a side window, flying shards of glass, and other projectiles. The curtain airbag may also help to keep the occupant inside the vehicle during a roll-over accident.

Generally, the un-inflated curtain airbag is installed in a very limited thin space defined by the roof frame member. Accordingly, the inflator may be a thin, cylindrical member which extends a portion of the length of the curtain airbag. In this manner, the curtain airbag inflator is capable of providing sufficient inflation gas to properly inflate the curtain airbag.

Generally, the inflator is installed within the textile bag of the curtain airbag apparatus. However, doing so generally requires the inflator to include a diffuser. Gas which fills the curtain airbag is generated by the ignition of gas generant within the inflator. Generally, the gas is created from the rapid burning of pyrotechnic materials. The gas (also referred to herein as exhaust gas) escapes exit ports in the inflator at a high velocity and temperature. Due to the limited space, the textile bag is generally stored by folding it up against the inflator. Without a diffuser, the hot gas is concentrated on the textile bag. The concentrated hot gas and the confined space may combine to cause the gas to burn one or more holes in the airbag material, which is generally a nylon or polyester weave. The holes cause the curtain airbag to inflate improperly.

A diffuser disperses the exhaust gas. Dispersing the gas allows the gas to expand and cool. A diffuser may also include a surface which further allows the gas to transfer some of its heat. A diffuser may be used to direct the gas leaving the exit ports. Gas may be directed to cause the textile airbag to inflate in a particular manner. Once the gas passes through a diffuser, the gas is sufficiently cooled and/or not concentrated to prevent burning holes in the textile airbag.

A diffuser may be built as part of the body of the inflator. Generally, doing so adds to the production and design costs of the inflator. Alternatively, separate parts may be secured to the inflator at appropriate points to function as diffusers and to direct the exhaust gas. When a diffuser is incorporated into the body of the inflator, this may require custom fabrication of inflator bodies for different vehicles. Custom fabrication is also expensive.

Accordingly, it would be an advancement in the art to provide an airbag diffusion system which is simple to fabricate. It would be a further advancement to provide an airbag diffusion system which directs the gas using a standardized inflator. Additionally, it would be an advancement in the art to provide an airbag diffusion system which prevents concentrated gas jets and cools the gas exiting the inflator to prevent holes in the airbag material. A further advancement in the art would be to provide a diffusion system and method of fabrication having minimal expense. The present invention provides these advancements in a novel and useful way.

BRIEF SUMMARY OF THE INVENTION

The apparatus of the present invention has been developed in response to the present state of the art, and in particular, in response to the problems and needs in the art that have not yet been fully solved by currently available airbag inflator diffusion systems. Thus, the present invention provides an airbag inflator diffusion system which is simple to fabricate and install, directs gas exiting the inflator, effectively diffuses and cools the gas, and may be fabricated with minimal expense.

In one embodiment, the airbag inflator diffusion system includes an airbag inflator. The inflator includes one or more gas exit ports disposed along its surface. The system also includes a sleeve. The inflator is installed securely within the sleeve. Generally, the sleeve is cylindrical in shape. Alternatively, the sleeve has a cross-section capable of receiving the inflator. The sleeve cross-section may be in a diamond, triangular, or parallelogram shape. The inflator is secured within the sleeve by the tight fit and bias between the sleeve and the inflator. The sleeve may include a lip or flange at each end to aid in securing the inflator within the sleeve. The sleeve includes one or more lobes.

A lobe is a solid rigid material formed as part of the sleeve and positioned such that gas leaving the exit port is impeded by the lobe. The lobe forces the gas to go around the lobe before entering the textile bag. Preferably one lobe is positioned above each exit port of the inflator. Depending on the positions of exit ports in the inflator, the lobes are generally positioned on alternating sides along the length of the sleeve.

In an alternative embodiment, the airbag inflator diffusion system includes a catch. The catch impedes gas flow from both ends of a lobe to the interior of the airbag. The catch serves to keep residue particles of the ignited gas generant from entering the airbag. These residue particles may be very hot and may cause holes in the airbag material. The catch also helps diffuse the exhaust gas. The catch may be a wire or fabric mesh.

The present invention includes a method of manufacturing a curtain airbag inflator diffuser. In one embodiment, a rigid cylindrical tube having a hollow space capable of receiving a curtain airbag inflator is bent. The tube is bent such that the tube obtains an elliptical cross-section and remains capable of receiving and securing the curtain airbag inflator.

Then, one or more sections of the tube are removed to form a lobe and an exhaust passage. The curtain airbag inflator is then inserted into the hollow space. The curtain airbag inflator and/or tube are then adjusted such that exits ports of the curtain airbag inflator aim toward lobes of the tube. A catch may be inserted between the inflator and the lobes such that exhaust gas is thereby impeded from leaving the exhaust passage.

According to an alternative embodiment of the method of manufacturing a curtain airbag inflator diffuser, a plurality of parallel slits are formed perpendicular to the longest edge of a pliable, planar, rectangular plate. The plate is bent on each side of each slit such that a plurality of lobes having triangular cross-sections extend in alternating directions perpendicular to the largest surface of the plate. The bending of the plate forms a sleeve. Next, a curtain airbag inflator is inserted between the plurality of lobes such that the curtain airbag inflator is secured within the sleeve. Additionally, a catch may be inserted between the curtain airbag inflator and the sleeve.

These and other features, and advantages of the present invention will become more fully apparent from the following description and appended claims, or may be learned by the practice of the invention as set forth hereinafter.

BRIEF DESCRIPTION OF THE DRAWINGS

In order that the manner in which the above-recited and other advantages of the invention are obtained and may be readily understood, a more particular description of the invention briefly described above will be rendered by reference to specific embodiments thereof which are illustrated in the appended drawings. Understanding that these drawings depict only typical embodiments of the invention, and are not therefore to be considered to be limiting of its scope, the invention will be described and explained with additional specificity and detail through the use of the accompanying drawings in which.

DETAILED DESCRIPTION OF THE PREFERRED EMBODIMENTS

The present invention can be better understood with reference to the drawings where like parts are designated with like numerals throughout.

Figure 1:
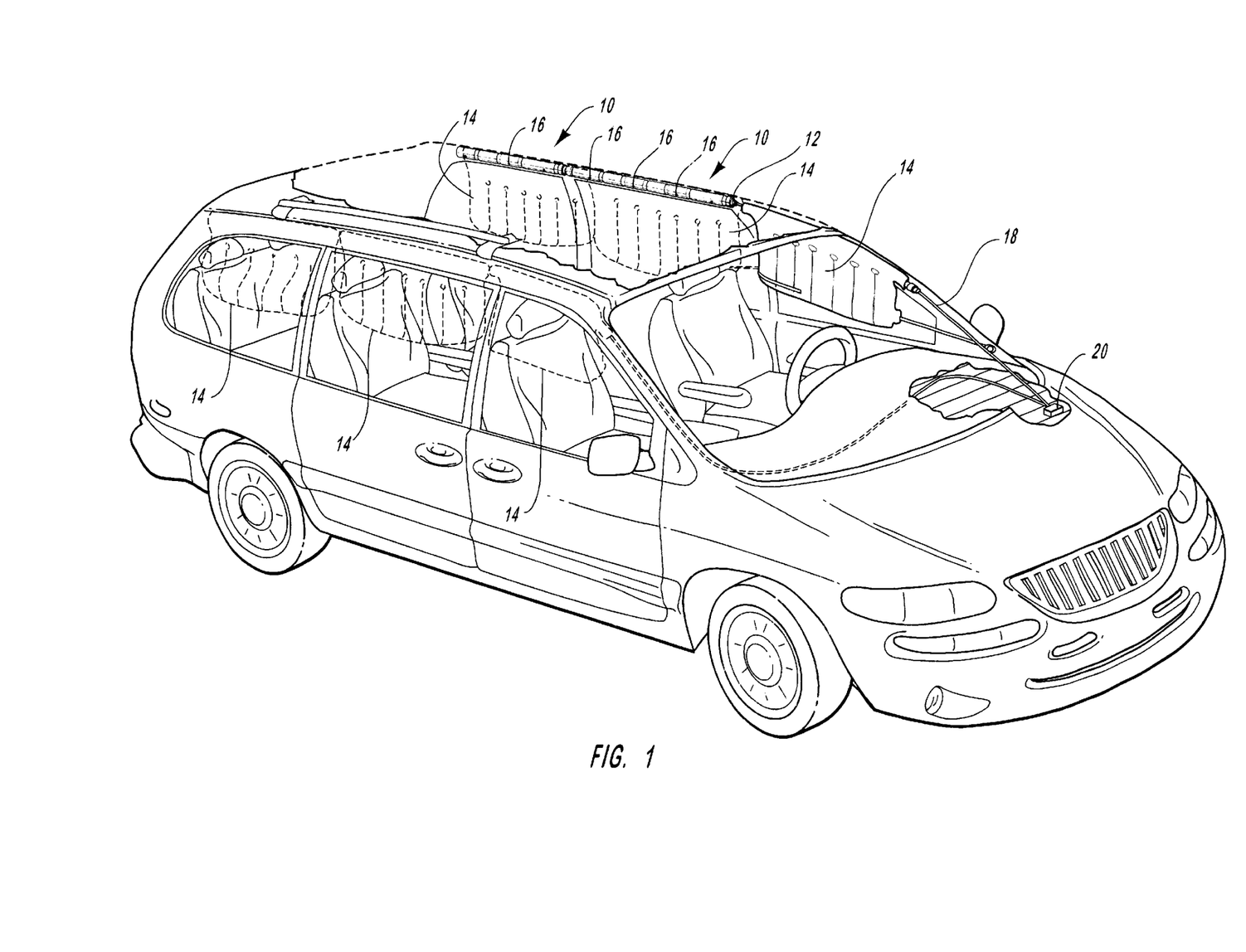
FIG. 1 is a perspective view illustrating within a vehicle where the curtain airbag apparatus and the diffuser are generally installed.

FIG. 1 is a perspective view illustrating where curtain airbag apparatuses 10 are generally installed. FIG. 1 illustrates a conventional vehicle equipped with a plurality of curtain airbag apparatuses 10. The illustrated vehicle is a van which has large windows and sides. The windows are larger than those generally found in passenger cars. The larger windows increases the need for curtain airbag apparatuses 10. The van has door and window frames which connect the body of the vehicle to the vehicle roof. The vehicle roof includes a roof frame.

FIG. 1 also illustrates how the curtain airbag deploys along an interior side of a vehicle. A curtain airbag inflation apparatus 10 is generally mounted behind an airbag cover (not shown) to the vehicle roof frame between a side door/window and the vehicle roof. Vehicles are generally designed to minimize the width of the vehicle roof frame on the sides to provide improved visibility and aesthetic appeal for vehicle occupants. These designs limit the storage space for the curtain airbag. However, the curtain airbag should still inflate to protect the occupant from impact with the vehicle's side interior.

A curtain airbag inflation apparatus 10 comprises an inflator 12. Although a curtain airbag apparatus 10 and/or curtain inflator 12 may be referred to and/or depicted herein, it is contemplated that the present invention may be made and practiced in relation to various other airbag apparatuses 10 and/or inflators 12. The inflator 12 provides gas to inflate a textile bag 14. Generally, gas is generated by the combustion of pyrotechnic materials within the inflator 12. The hot gas leaves the inflator 12 through exit ports 16 and enters the textile bag 14. The inflator 12 should produce enough gas to fully inflate the textile bag 14. The textile bag 14 is sized to occupy a volume of space between the occupant and the side of the vehicle when inflated.

The inflator 12 is electronically connected by wiring 18 to the electronic control unit (ECU) 20. As mentioned above, the ECU 20 senses when the vehicle is in an accident and sends an electrical signal through wiring 18 to ignite gas generant within the inflator 12. The ignited gas generant creates exhaust gas which exits the inflator 12 through exit ports 16 to fill the textile bag 14. Prior to inflation, the textile bag 14 is stored folded between an airbag cover (not shown) and the inflator 12. If the airbag inflation apparatus 10 does not have a diffuser, then the concentrated hot exhaust gas jets may burn holes in the textile bag 14. The holes could prevent the textile bag 14 from providing adequate protection.

Figure 2A:
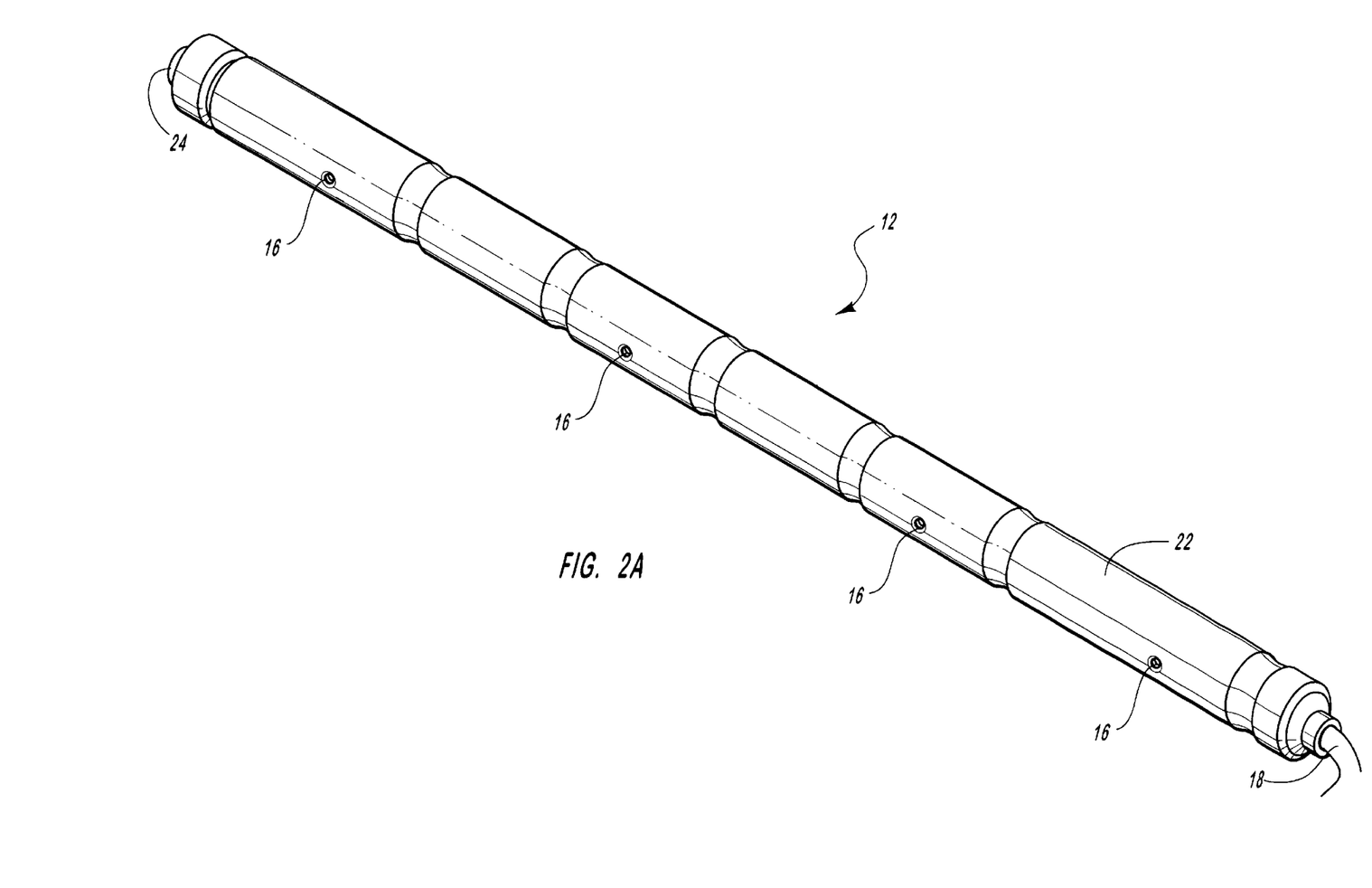
FIG. 2A is a perspective view of a curtain airbag inflator.

FIG. 2A illustrates a curtain airbag inflator 12. The inflator 12 includes a tubular body 22. The body 22 is connected on one end to wiring 18. Within the body 22 is a hollow passage way (not shown) which contains gas generant toward the end connected to the wiring 18. The wiring 18 transmits an electrical signal which causes an initiator (not shown) to ignite the gas generant. A base 24 is attached to the body 22 opposite the wiring 18 and seals the passage way. The exhaust gas is forced to leave the inflator 12 through exit ports 16. The exit ports 16 may be disposed along the length of the body 22.

Preferably, the exit ports 16 are disposed along the body 22 to provide even distribution of exhaust gas along the length of the textile bag 14. In FIG. 2A, the exit ports 16 are distributed in-line along one side of the body 22. The body 22 may also include exit ports 16 which alternate along the opposite side of the body 22.

The exit ports 16 may be formed by drilling holes in the body 22. The body 22 and exit ports 16 may be inexpensively produced because there are no additional structures on the body 22 for directing the exhaust gas exiting the exit ports 16. Exhaust gas leaving the exit ports 16 is under high pressure and travels straight out the exit ports 16.

Figures 2B, 2C:
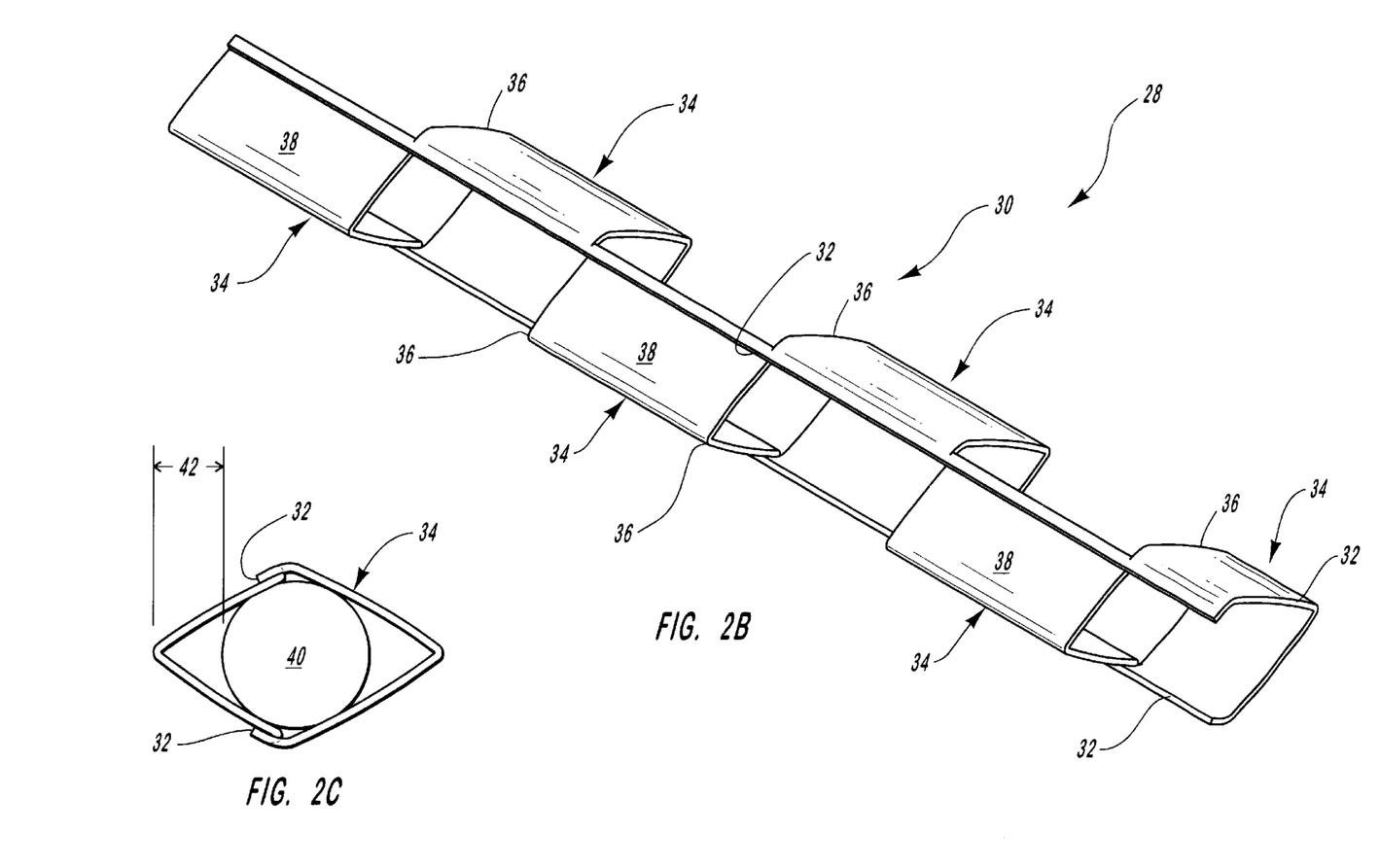
FIG. 2B is a perspective view of one embodiment of a diffuser according to the present invention.
FIG. 2C is an end perspective view illustrating an exhaust chamber and the location of an installed airbag inflator.

Referring now to FIG. 2B, a diffuser 28 within the scope of the present invention is illustrated. The diffuser 28 diffuses exhaust gas leaving the inflator 12. The diffuser 28 includes a sleeve 30. The sleeve 30 is preferably made of a rigid metal such as steel, aluminum, copper, or the like. The sleeve 30 may be substantially the same length as the inflator 12. Alternatively, the sleeve 30 may be of a length such that exhaust gas leaving at least one exit port 16 is diffused by the sleeve 30.

A sleeve 30 includes a wall 32. The wall 32 provides the main structural support for the sleeve 30. The wall 32 connects one or more lobes 34.

Preferably, a lobe 34 is formed as part of the wall 32 of the sleeve 30. A lobe 34 includes two ends 36 and a middle 38. The middle 38 connects the two ends 36. Generally, the middle 38 is formed from the wall 32. When taken between the two ends 36, a cross-section of the middle 38 may have various shapes including arcuate, substantially triangular, angled, and the like.

Referring specifically to FIG. 2C and generally to FIG. 2B, an end perspective view of the embodiment of FIG. 2B is illustrated. Together, the wall 32 and lobes 34 define a cavity 40. The cavity 40 is sized to receive and secure an inflator 12 within the sleeve 30. The wall 32 and lobes 34 cooperate to bias the inflator 12 within the cavity 40. Alternatively or in addition, an end 36 may be bent, crimped, or folded to further secure the inflator 12 within the sleeve 30.

Once an inflator 12 is inserted into the sleeve 30, the inflator 12, wall 32 and lobe 34 define an exhaust passage 42 between the inflator 12 and the lobe 34. The exhaust passage 42 provides an area between the exit port 16 and the lobe 34 in which exhaust gas may disperse and cool. The lobe 34 impedes the exhaust gas to cause the dispersion of the exhaust gas within the exhaust passage 42.

As mentioned above, exhaust gas leaving the exit port 16 may be concentrated due to the size of the exit port 16 and force created by the ignited gas generant. The exhaust gas leaves the exit port 16 in a direction perpendicular to the exit port 16. The lobe 34 deflects the exhaust gas toward either end 36 of the lobe 34. This deflection causes the exhaust gas to transfer some of its heat to the lobe 34. The deflection also causes the exhaust gas to disperse in two different directions within the exhaust passage 42. Dispersion of the exhaust gas causes the gas to cool as it expands and transfers its heat to air within the exhaust passage 42.

Generally, exit ports 16 are positioned in line with each other and located on alternating sides of the inflator 12. Accordingly, lobes 34 are formed in the sleeve 30 such that once the inflator 12 is installed within the sleeve 30, the exit ports 16 are substantially centered between the ends 36 of a lobe 34. Such positioning of the exit ports 16 also means the distance between lobes 34 along one side is substantially the same as the length of the middles 38. Generally, the number of lobes 34 formed in the sleeve 30 corresponds to the number of exit ports 16 in the inflator 12.

Figures 2D, 2E:
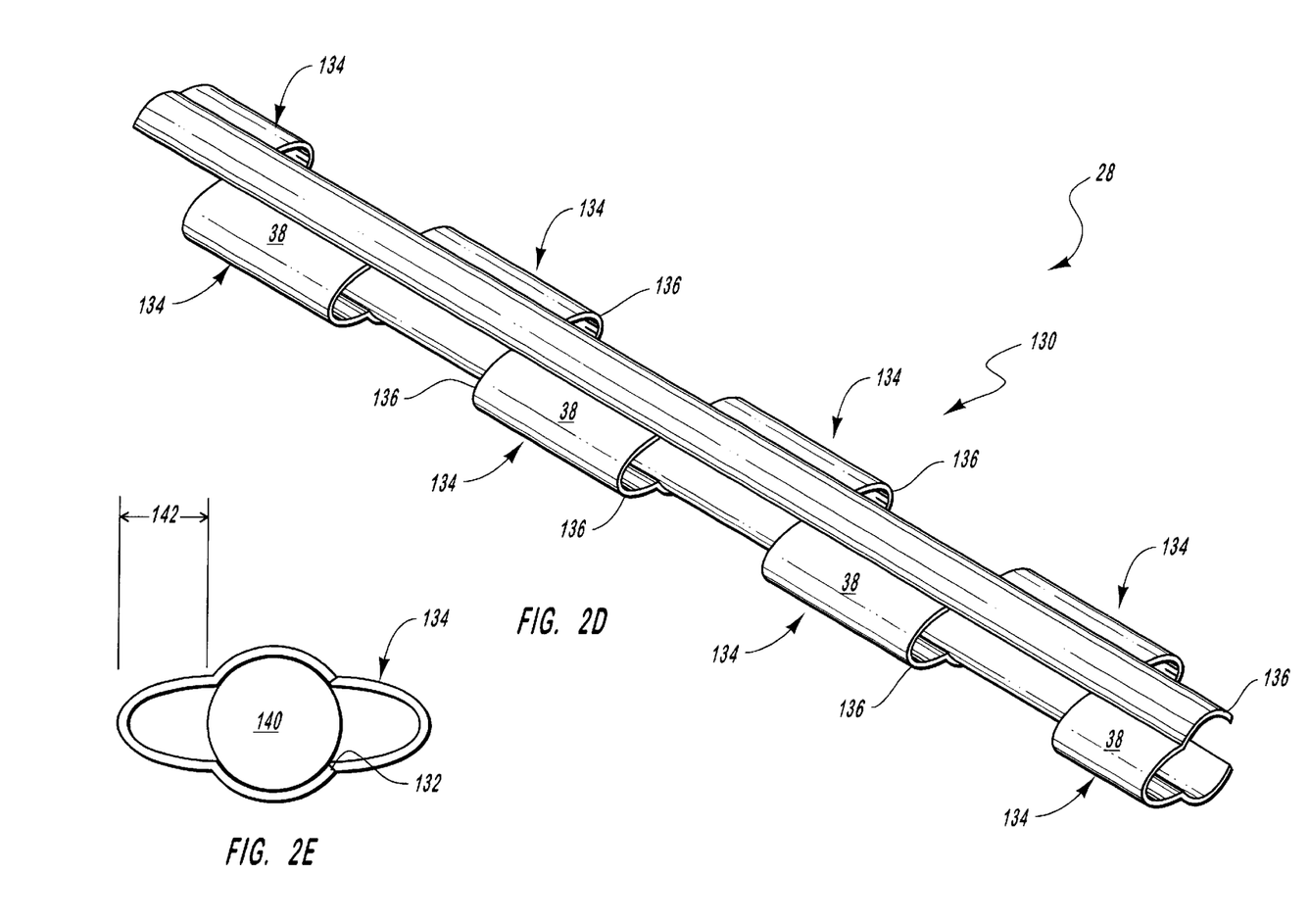
FIG. 2D is a perspective view of another embodiment of a diffuser within the scope of the present invention.
FIG. 2E is an end perspective view of another embodiment illustrating an exhaust chamber and the location of an installed airbag inflator.

In FIG. 2D an alternative embodiment of a diffuser 28 is illustrated. This embodiment includes a sleeve 130, lobes 134, an exhaust passage 142, and a cavity 140. The sleeve 130 is cylindrical in shape. The sleeve 130 is preferably made of metal. As described in more detail below, the sleeve 130 may be fabricated from a metal tube which is bent laterally in one direction forcing the wall 132 to extend radially. Then, sections of the wall 132 may be removed to create lobes 134.

The lobes 134 in the depicted embodiment have an arcuate cross-section. As in FIG. 2B, the number and positioning of the lobes 134 is generally directly related to the number and positioning of the exit ports 16 of the inflator 12.

FIG. 2E illustrates an end perspective view of the embodiment of FIG. 2D. Cavity 140 corresponds to cavity 40 of FIG. 2C. Exhaust passage 142 is similar to exhaust passage 42 illustrated in FIG. 2C.

Figure 2F:
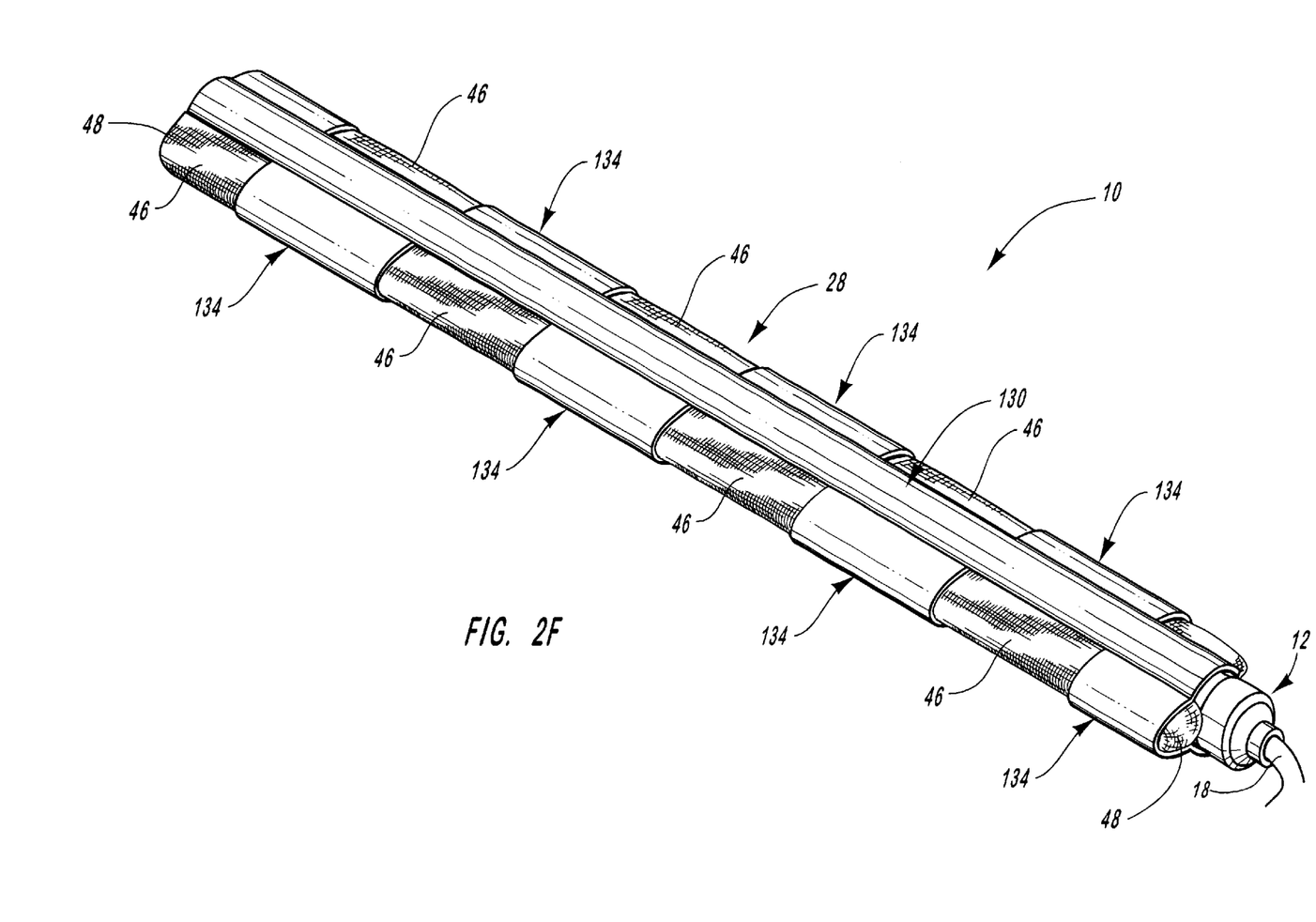
FIG. 2F is a perspective view of another embodiment of a diffuser having an airbag inflator installed and including a catch.

FIG. 2F illustrates an assembled curtain airbag inflation apparatus 10. An inflator 12 is installed within the diffuser 28 illustrated in FIG. 2D. Once installed, the inflator 12 may be rotated about its lateral axis such that each exit port 16 is within a lobe 134, rather than contacting the wall 32 of the sleeve 130. The inflator 12 may be moved laterally within the sleeve 130 such that the exit ports 16 are substantially centered beneath the lobes 134.

Generally, when gas generant within the inflator 12 burns, 10 to 40% of the gas generant's original volume remains as residue. The residue may be in solid and/or liquid form as ash or slag. This residue maybe projected through the hollow passage way (not shown) of the inflator 12 and out the exit ports 16. Even with the sleeve 130 installed, the residue may travel through the exhaust passage 142 past the lobe 134 and into the textile bag 14. The residue may burn holes in the textile bag 14 and possibly strike and injure the occupant.

FIG. 2F also illustrates a catch 46. The catch 46 may cooperate with the sleeve 130 to improve exhaust gas diffusion and cooling provided by the diffuser 28. The catch 46 also provides a barrier for hot residue left from burning the gas generant. Generally, the catch 46 is made from metal, fabric, ceramic, or similar flame-retardant material. The catch 46 comprises a plurality of holes. The holes may be organized in a mesh or other pattern. Alternatively, the material of the catch 46 may be a porous material which allows exhaust gas to pass through and blocks residue pieces.

Referring still to FIG. 2F, the catch 46 preferably is installed within the exhaust passage 142. The catch 46 may be biased between the a lobe 134 and the body 22 of the inflator 12. The catch 46 is closed at each end 48 to prevent residue pieces from exiting the exhaust passage 142. The catch 46 may extend from one lobe 134 to each successive lobe 134 along one side of the sleeve 130. Alternatively, a plurality of catches 46 may be provided such that ends 48 of each catch 46 substantially align with the ends 136 of each lobe 134. As illustrated, a first catch 46 made of wire mesh may be installed between the lobes 134 on one side of sleeve 130 and a similar second catch 46 may be installed on the other side of the sleeve 130. Alternatively, a catch 46 may be secured to the outside of the sleeve 130 such that the exhaust passages 142 are obstructed by the catch 46.

The curtain airbag inflation apparatus 10 in FIG. 2F may be easily assembled. First, inflator 12 is inserted into the sleeve 130. The inflator 12 may be moved laterally within the sleeve 130 or rotated about its lateral axis such that the exit ports 16 are centered under the lobes 134. A portion of the wall 132 of the sleeve 130 maybe crimped to secure the inflator 12. Then, a first catch 46 is threaded between the lobes 134 and the inflator 12 along one side of the sleeve 130. Similarly, a second catch 46 is threaded along the other side of the sleeve 130. And finally, the ends 48 of the catches 46 are bent to close the exhaust passages 142.

Figure 3A:
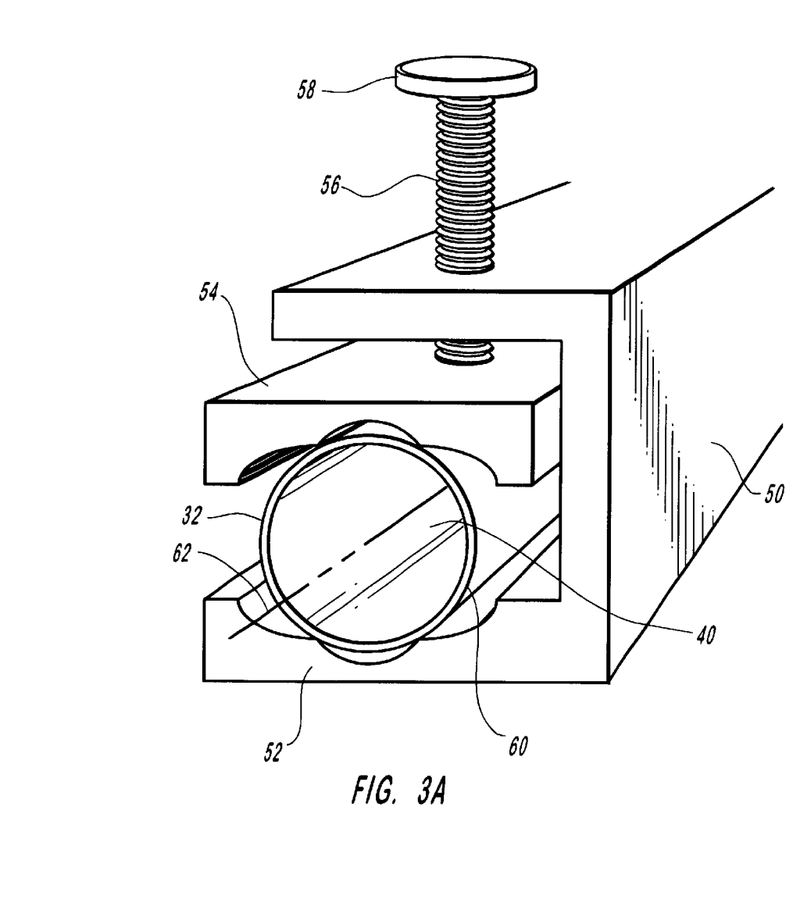
FIG. 3A is a perspective view illustrating a press prior to shaping a tube according to one embodiment of a method of manufacture according to the present invention.
Figure 3B:
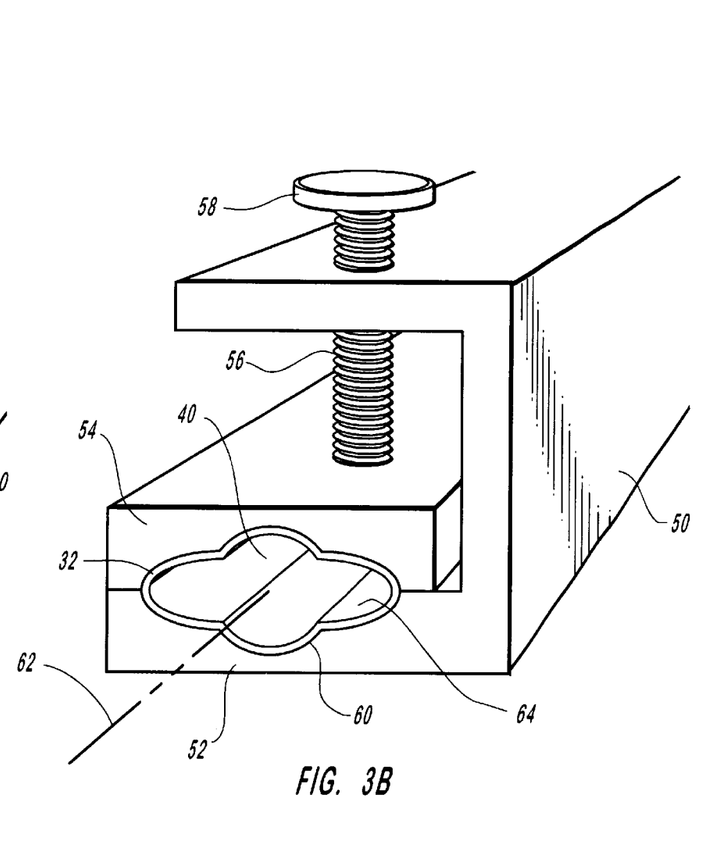
FIG. 3B is a perspective view illustrating a press after shaping a tube according to one embodiment of a method of manufacture.

FIGS. 3A–3B illustrate a method of fabricating a diffuser 28 within the scope of the present invention. In FIG. 3A, a press 50 is illustrated. The press 50 includes a base die 52, a top die 54, a screw 56, and a handle 58. The base die 52 and top die 54 are configured such that pressing an object will form a desired cross-section in the object. The screw 56 and handle 58 enable the top die 54 to be pressed until the top die 54 meets the base die 52.

According to a method of the present invention, first, a tube 60 is provided. The tube 60 is preferably made of a material which is easily bent and retains a new shape. The tube 60 is preferably made of a metal such as steel, copper, aluminum, or the like. The tube 60 includes a wall 32 which defines a cavity 40 within the tube 60. As illustrated in FIG. 3A, the tube 60 has a circular cross-section. However, the tube 60 may have various desirable cross-sections such as square, rectangular, or other polygonal cross-sections.

The tube 60 is generally sized such that once the tube 60 is bent, the cavity 40 may receive an inflator 12. A longitudinal axis 62 runs preferably through the center of the cavity 40. The length of the tube 60 is substantially equal to the length of the inflator 12.

The tube 60 is placed on base die 52. Then, handle 58 is turned to lower the top die 54 using screw 56. Alternative mechanisms besides the handle 58 and screw 56 may be used for pressing top die 54 to meet base die 52 including hydraulic, electrical, and other mechanical mechanisms. The lowering top die 54 presses the wall 32 of the tube 60 to begin closing the cavity 40. Because the top die 54 and base die 52 are open on the sides, the wall 32 on the sides extends radially from the longitudinal axis 62 towards the sides of the dies 52,54.

FIG. 3B illustrates the tube 60 and press 50 once the top die 54 meets the base die 52. The wall 32 has been bent to circumscribe a cross-section defined by the top die 54 meeting the base die 52. Cavity 40 still remains substantially centered about longitudinal axis 62. The tube 60 now has a substantially elliptical cross-section.

Figures 3C, 4A:
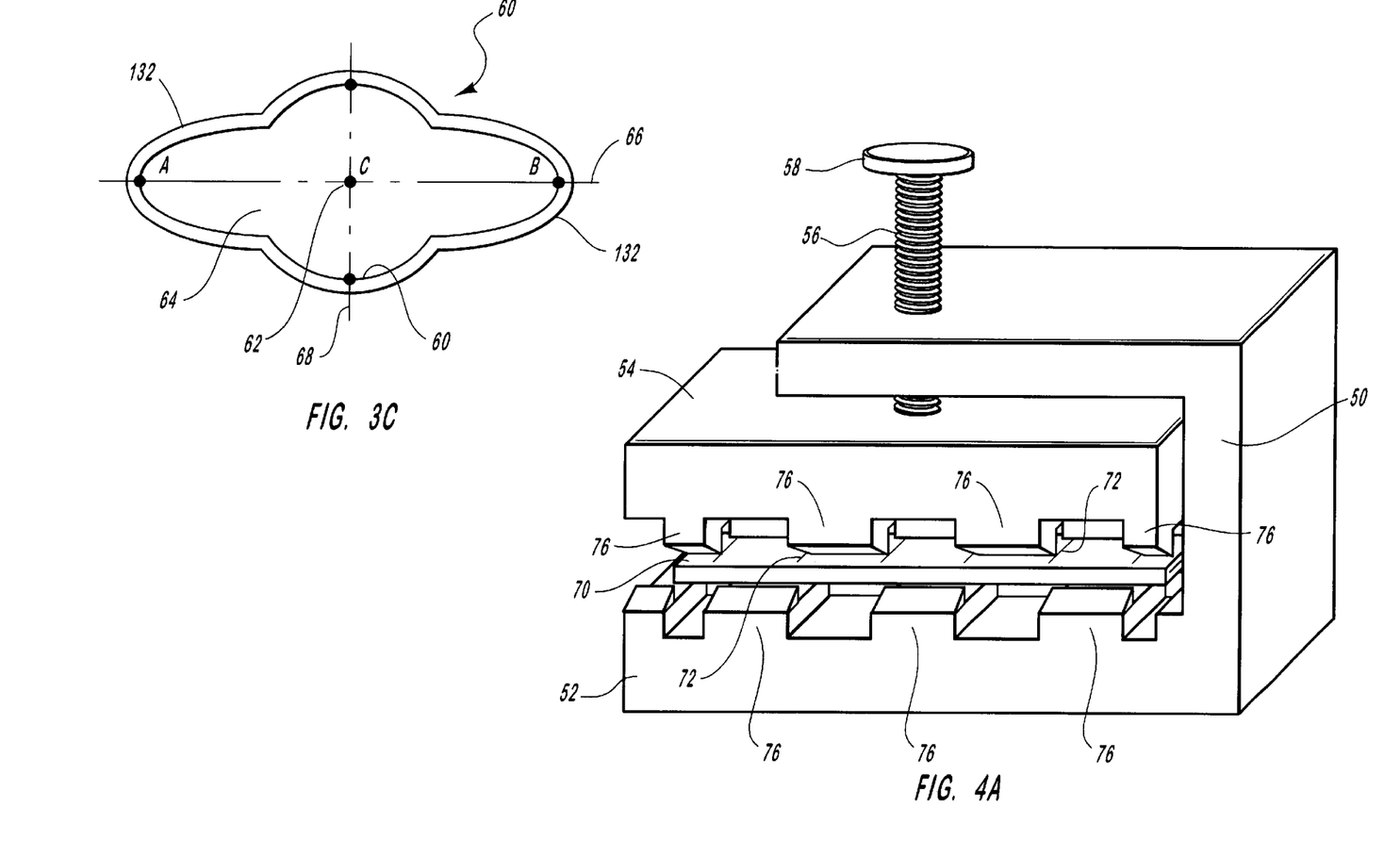
FIG. 3C is a graph illustrating axes within a tube which may be used to understand how sections are removed from the tube to form lobes.
FIG. 4A is a perspective view illustrating a plate and a press prior to shaping the plate to form a diffuser in one embodiment of a method of manufacture according to the present invention.

FIG. 3C is a graph illustrating a cross-sectional view of tube 60 in FIG. 3B. FIG. 3C illustrates an x-axis of symmetry 66 and a y-axis of symmetry 68. Point A and Point B indicate points along the x-axis of symmetry 66 within the tube 60. Point C represents the longitudinal axis 62. A length between point A and point B, along the x-axis of symmetry 66 defines the major axis AB of the tube 60 cross-section. In FIG. 3B the tube 60 is pressed in a direction perpendicular to this major axis AB.

Referring now generally to FIGS. 3A–3C and specifically back to FIG. 2F, the tube 60 is removed from the press 50. The tube 60 is oriented according to the cross-section depicted in FIG. 3C. Then, a section along the length of the tube 50 is removed.

The section is a portion of the wall 32 along the major axis AB between point A and point C. The section may be removed by cutting parallel to the major axis AB from point A toward a point between points A and C. Then, the cut is continued along the length of the tube 60, parallel to the longitudinal axis 62. Next, the cut is continued parallel to the major axis AB in a direction from point C to point A. In this manner a section may be removed from the tube 60.

Similarly, a section may be removed on a side of the major axis AB between point C and point B. The process of removing sections may then be repeated along the length of the tube 60. Preferably, no sections of wall 32 are removed on both sides of the major axis AB along the same length of tube 60. Removing the section creates the lobes 134 illustrated in FIG. 2D. Preferably, the sections are removed in an alternating pattern along the length of the tube 60. In this manner, the tube 60 becomes a diffuser 28 within an embodiment of the present invention.

In FIG. 4A, the apparatus and materials used to fabricate an alternative embodiment of a diffuser 28 are illustrated. A substantially, planar, rectangular pliable plate 70 is provided. First, slits 72 are made in the plate 70 at points along the length of the plate 70 corresponding to the desired positions of the ends 36 of the lobes 34. Each slit 72 runs perpendicular to the longest edge of the plate 70. Preferably, each slit 72 is aligned and is of a shorter length than the shortest length of the plate 70. Alternatively, the slit 72 may begin within the plate 70 and extend beyond a longest edge of the plate 70. In another alternative, scores 72 rather than slits 72 may be made in the plate 70.

Next, the plate 70 is placed in a press 50. As in FIG. 3B, the press 50 includes a base die 52, a top die 54, a screw 56, and a handle 58. In this embodiment, the base die 52 and top die 54 include teeth 76. The teeth 76 have a width substantially equal to the width of the middle 38 of a lobe 34. The cross-section of the teeth 76 substantially corresponds to a cross-section of a middle 38 of a lobe 34 of the diffuser 28 illustrated in FIG. 2B.

By turning the handle 58 and screw 56, the top die 54 is forced to meet the base die 54. The press 50 forces the material of the plate 50 between the slits 72 to be bent in opposite directions to correspond with the teeth 76. The press 50 is then opened. The bent plate 70 now forms a sleeve 30 capable of serving as a diffuser 28.

Figure 4B:
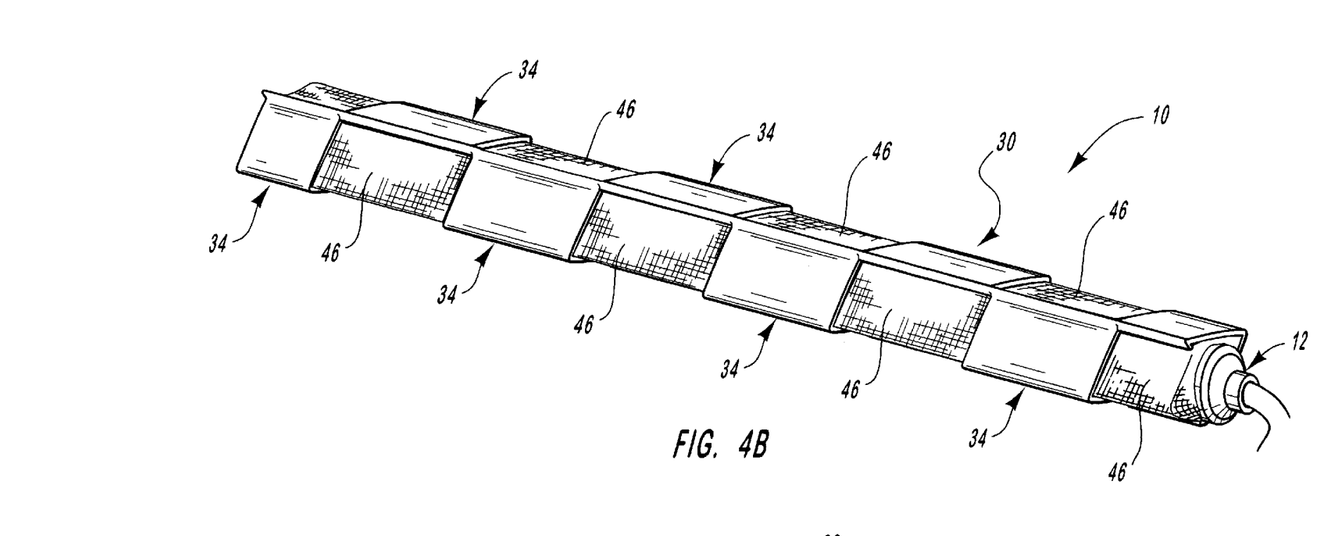
FIG. 4B is a perspective view of an embodiment of the present invention having the curtain airbag inflator and catch installed within the diffuser.

FIG. 4B illustrates the plate 70 functioning as a sleeve 30. The inflator 12 is inserted into the sleeve 30. A catch 46 is inserted between the lobes 34 of the sleeve 30 and the inflator 12.

Figure 5:
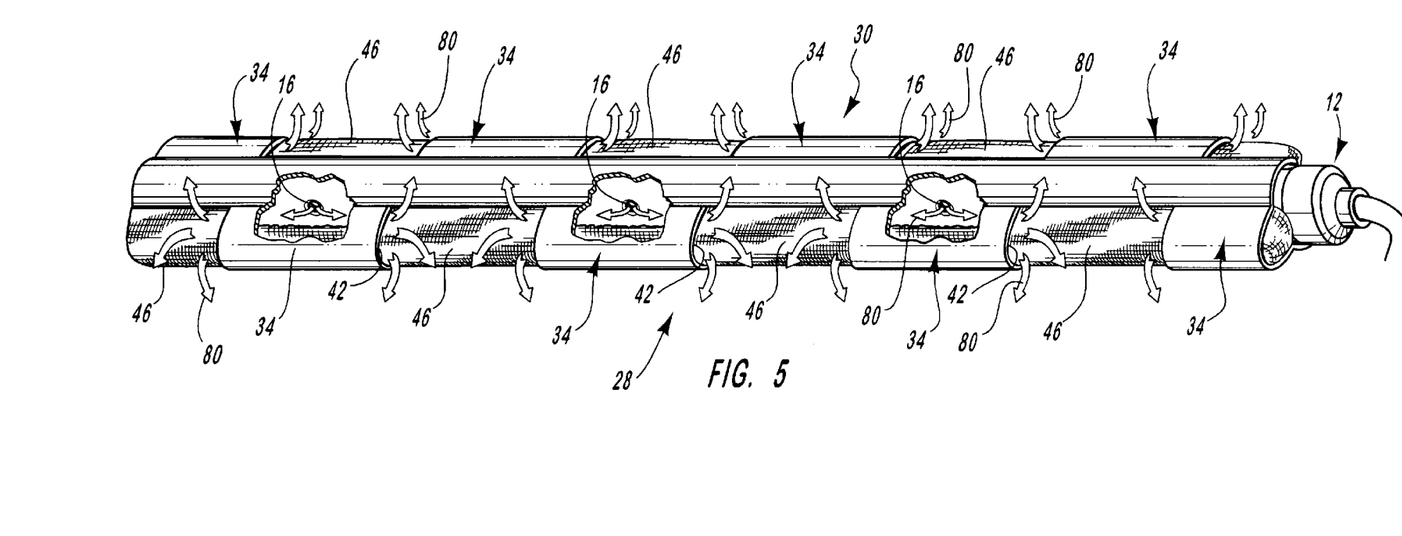
FIG. 5 is a perspective view of one embodiment of the present invention illustrating the flow of exhaust gas from the inflator into the airbag.

FIG. 5 illustrates the operation of the diffuser 28 once installed on the inflator 12. The operation of the diffuser 28 may be understood by tracing the flow 80 of exhaust gas from within the inflator 12 to an area external to the diffuser 28. The flow 80 of exhaust gas is illustrated by arrows. Of course, the exhaust gas follows other paths. Flow 80 is simply an indication of the general direction the exhaust gas flows through the diffuser 28. Flow 80 is described below in relation to one lobe 34. However, a similar flow 80 occurs at all the lobes 34 illustrated.

As discussed above, the exhaust gas is created within the inflator 12 by ignition of gas generant. The inflator 12 is sealed except for exit ports 16. FIG. 5 illustrates through a cut-away portion the flow 80 leaving an exit port 16. The flow 80 is very hot and carries pieces of residue from the burnt gas generant. The flow 80 also has a high velocity. The high velocity causes the flow 80 to move away from the port 16 in a perpendicular direction. The flow 80 enters the exhaust passage 42. The flow 80 then impacts the lobe 34. The solid middle 38 of the lobe 34 diverts the flow 80 towards both ends 36 of the lobe 34. The impact of the flow 80 on the middle 38 allows the exhaust gas to transfer heat to the lobe 34.

Then, the flow 80 travels through the exhaust passage 42. The exhaust gases expand as they move from the high pressure area inside the inflator 12 to the low pressure region inside exhaust passage 42 which causes the gas to cool. The flow 80 travels through the exhaust passage 42 and comes to the ends 36 of the lobe 34. After passing the ends 36, the flow 80 mixes with flow 80 from a neighboring lobe 34. This mixing forces the flow 80 to pass through the holes in the catch 46 and enter an area external to the diffuser 28. The flow 80 then goes on to inflate the textile bag 14 of the curtain airbag inflation apparatus 10.

As the flow 80 passes through the catch 46 more heat from the exhaust gas is transferred to the catch 46. The holes in the catch 46 also cause the flow 80 to separate into smaller air flows 80 moving in different directions. The re-direction also causes the flow 80 to cool and become more diffused. The pieces of residue from the burnt gas generant are generally larger than the holes in the catch 46. Also, molten liquid residue tends to condense on the cool, high surface area mesh of catch 46. Therefore, the residue pieces are left inside the exhaust passage 42. In this manner, the diffuser 28 of the present invention provides a simple, and effective device for diffusing exhaust gas from a curtain airbag inflator 12.

Referring generally to FIGS. 1–5, the present invention provides an airbag diffusion system which is simple to fabricate. The system uses standardized inflators 12 having exit ports 16 which are direction neutral. The exhaust gas is directed by the diffuser 28. The system provides a diffuser 28 which sufficiently cools and diffuses the exhaust gas. The diffuser may also include a catch 46 which catches hot residue from the burnt gas generant, and further diffuses the exhaust gas.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed and desired to be secured by Letters Patent is:

1. An airbag inflator diffusion system comprising:
   an airbag inflator having an exhaust gas exit port;
   a sleeve that receives the inflator and secures the inflator within the sleeve, the sleeve defining an opening, wherein the sleeve comprises a lobe aligned with the gas exit port such that exhaust gas leaving the exit port is impeded by the lobe.

2. An airbag inflator diffusion system, as in claim 1, wherein the sleeve comprises a plurality of lobes and the airbag inflator comprises a plurality of exit ports, each of the lobes being aligned with at least one of the exit ports such that exhaust gas leaving the plurality of exit ports is impeded by the plurality of lobes.

3. An airbag inflator diffusion system, as in claim 1, wherein the sleeve is cylindrical in shape.

4. An airbag inflator diffusion system, as in claim 3, wherein the plurality of lobes are positioned in an alternating pattern along two sides of the sleeve.

5. An airbag inflator diffusion system, as in claim 1, wherein both ends of the sleeve secure the airbag inflator within the sleeve.

6. An airbag inflator diffusion system, as in claim 1, wherein the lobe is triangular in cross-section.

7. An airbag inflator diffusion system, as in claim 1, wherein the sleeve is metallic.

8. An airbag inflator diffusion system, as in claim 1, further comprising a catch positioned within the opening in the sleeve.

9. An airbag inflator diffusion system, as in claim 8, wherein the catch comprises a wire mesh material.

10. An airbag inflator diffusion system, as in claim 8, wherein the catch comprises a mesh formed from metal.

11. An airbag inflator diffusion system, as in claim 8, wherein the catch comprises a fabric mesh material.

12. An airbag inflator diffuser comprising:
   a rigid tubular sleeve;
   a lobe which extends a wall of the sleeve radially for a section along a length of the sleeve to form an exhaust passage, the sleeve defining an opening,
   wherein the lobe is aligned with an exhaust gas exit port of an airbag inflator installed within the sleeve, such that exhaust gas leaving the exit port is impeded by the lobe; and
   a catch positioned within the opening.

13. An airbag inflator diffuser, as in claim 12, wherein the catch comprises a plurality of holes disposed throughout the catch.

14. An airbag inflator diffuser, as in claim 12, wherein the plurality of holes are disposed in the catch to form a pattern.

15. An airbag inflator diffuser, as in claim 14, wherein each end of the catch is configured such that one side of the catch meets the other side of the catch and closes an opening between the exhaust passage and the area external to the diffuser.

16. An airbag inflator diffuser, as in claim 15, wherein the catch is made of metal material.

17. An airbag inflator diffuser, as in claim 15, wherein the catch is made of porous material.

18. A method for fabricating an airbag inflator diffuser, comprising:

providing a rigid cylindrical tube that defines a hollow space that is capable of receiving an airbag inflator;

pressing the tube in a direction perpendicular to a longitudinal axis of the tube such that the tube obtains an elliptical cross-section and remains capable of receiving and biasing the airbag inflator within the hollow space;

removing a section of the tube such that a lobe and an exhaust passage are formed on a side of the tube; and inserting the airbag inflator longitudinally within the tube such that the lobe partially obstructs an exit port disposed in the airbag inflator.

19. A method as in claim 18, further comprising inserting a catch between the inflator and the lobe such that the catch is positioned between the exhaust passage and an area external to the airbag inflator diffuser.

20. A method as in claim 18, further comprising crimping each end of the tube to secure the airbag inflator within the tube.

21. A method as in claim 20, wherein removing comprises cutting a plurality of sections at alternating locations along the longitudinal axis of the tube to form a plurality of lobes and a plurality of exhaust passages.

22. A method for fabricating an airbag inflator diffuser, comprising:

forming a plurality of parallel slits perpendicular to a longest edge of a pliable, planar, rectangular plate, the slits being shorter than the shortest edge of the piece;

bending the plate on each side of each slit such that a plurality of lobes having triangular cross-sections which extend in alternating directions perpendicular to a largest surface of the plate to form a sleeve; and inserting an airbag inflator in between the plurality of lobes such that a central lateral axis of the sleeve aligns with a central lateral axis of the airbag inflator.

23. A method as in claim 22, further comprising crimping an external edge of a lobe on each end of the plate such that the airbag inflator is secured within a cavity defined by the plurality of lobes.

24. A method as in claim 22, further comprising:

inserting a first catch between the airbag inflator and a plurality lobes along a first side of the central lateral axis of the sleeve; and inserting a second catch between the airbag inflator and a plurality lobes along a second side of the central lateral axis of the sleeve.

25. A method as in claim 22, wherein the plurality of lobes define a cavity that receives the airbag inflator and biases the airbag inflator to secure the airbag inflator within the cavity.

26. An airbag inflator diffusion system comprising:

an airbag inflator having a plurality of exhaust gas exit ports;

a sleeve that receives the inflator and secures the inflator within the sleeve, the sleeve defining a plurality of openings, wherein the sleeve comprises a plurality of lobes, each of the exhaust gas exit ports being aligned with one of the lobes such that exhaust gas leaving each exit port is impeded by at least one of the lobes, each lobe having an end that defines a portion of one of the openings in the sleeve.

27. An airbag inflator diffusion system, as in claim 26, wherein the lobes are positioned in an alternating pattern along two sides of the sleeve.

28. An airbag inflator diffusion system, as in claim 26, further comprising a catch positioned within the openings in the sleeve.

* * * * *